United States Patent
Yundt-Pacheco

(10) Patent No.: US 6,549,876 B1
(45) Date of Patent: Apr. 15, 2003

(54) METHOD OF EVALUATING PERFORMANCE OF A HEMATOLOGY ANALYZER

(75) Inventor: John C. Yundt-Pacheco, Fairview, TX (US)

(73) Assignee: Xyletech Systems, Inc., Plano, TX (US)

( * ) Notice: Subject to any disclaimer, the term of this patent is extended or adjusted under 35 U.S.C. 154(b) by 0 days.

(21) Appl. No.: 09/625,121

(22) Filed: Jul. 25, 2000

(51) Int. Cl.⁷ .......................... G06F 15/30; G01N 37/00
(52) U.S. Cl. ......................................... 702/182; 702/81
(58) Field of Search ............................. 702/22, 30, 31, 702/81–86, 79–188; 714/736; 422/3, 119

(56) References Cited

U.S. PATENT DOCUMENTS

| | | | | |
|---|---|---|---|---|
| 4,202,033 A | * | 5/1980 | Strobel | 436/183 |
| 4,858,154 A | * | 8/1989 | Anderson et al. | 702/81 |
| 5,532,941 A | * | 7/1996 | Lin | 702/84 |
| 5,574,906 A | * | 11/1996 | Morris | 707/1 |
| 5,798,267 A | * | 8/1998 | Harasymiw | 436/97 |
| 5,835,384 A | * | 11/1998 | Lin | 702/84 |
| 6,142,017 A | * | 11/2000 | Glassey | 73/299 |

* cited by examiner

Primary Examiner—Marc S. Hoff
Assistant Examiner—Manuel L. Barbee
(74) Attorney, Agent, or Firm—Stinson Morrison Hecker LLP; J. David Wharton

(57) ABSTRACT

A procedure for evaluating the performance of an instrument, particularly a hematology analyzer, by comparing its operating data with data compiled from a group of like instruments is provided. The method contemplates collecting historical data which is deposited in a central database where it may retrieved by any participating laboratory. The participating laboratory performs an analysis and then accesses the database to retrieve data obtained from comparable instruments performing like analyzes. The comparative analysis is then conducted from which a determination may be made with regard to a particular instrument.

14 Claims, 9 Drawing Sheets

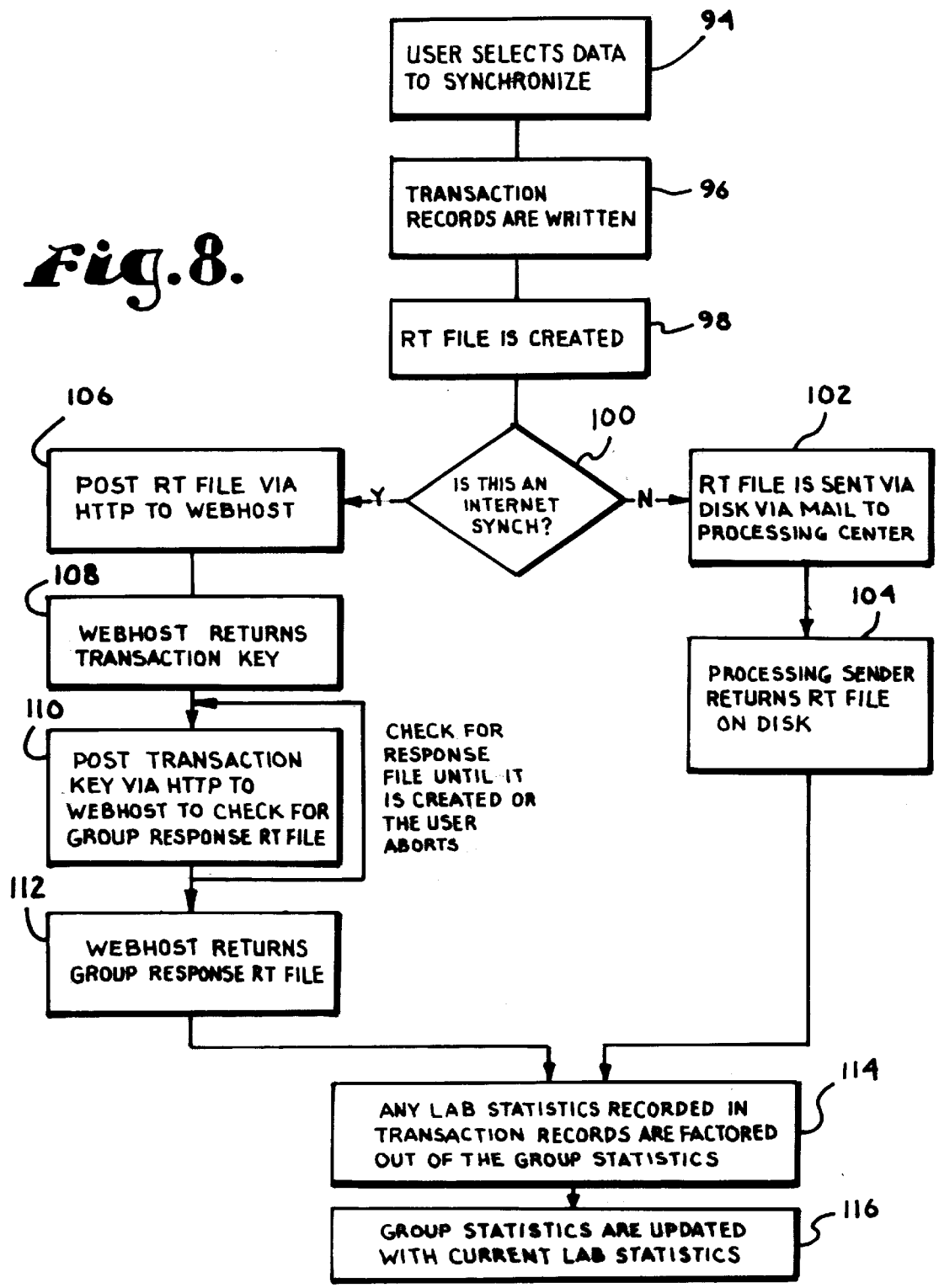

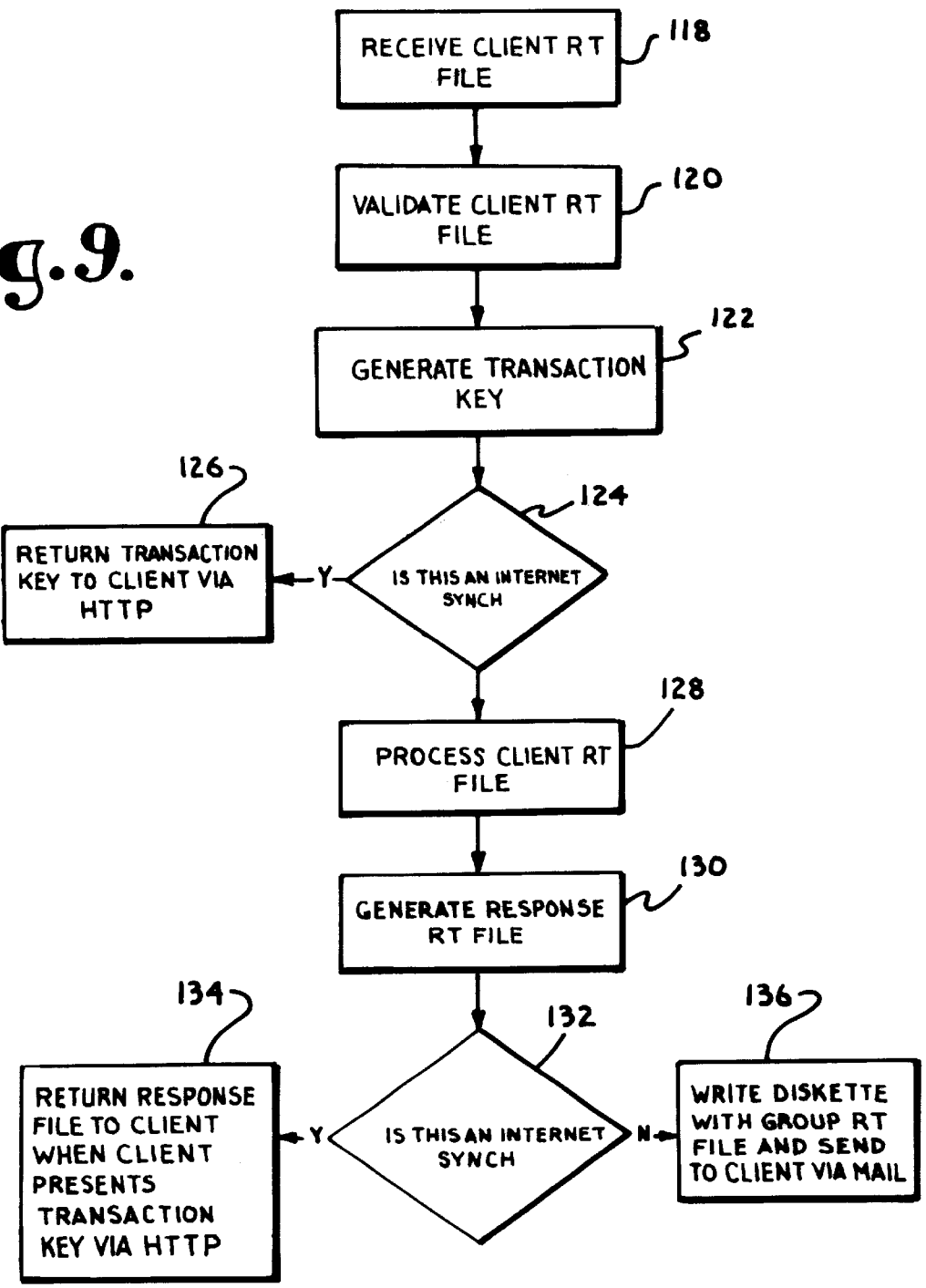

METHOD OF EVALUATING PERFORMANCE OF A HEMATOLOGY ANALYZER

This invention relates to a method of comparative analysis between historical group data and current analytical data for the purpose of validating the operating accuracy of an instrument. In particular, the invention relates to a method of verifying the operating accuracy of hematology analyzers by comparing current data generated by testing a control substance with historical data collected from a group of similar analyzers testing the same control substance.

BACKGROUND OF THE INVENTION

Quality control data is generated in the clinical laboratory by causing an analyzer to test known specimens (controls). Such data is typically gathered from a number of instruments all testing the same control substance. The data is then normally subjected to statistical analysis to determine if a particular analyzer is functioning properly, or "in control," prior to testing patient specimens. In many instances, United States federal law mandates daily testing of the analytical system prior to testing specimens from humans. Even when not required by law, daily evaluations of the analytical systems is considered to be proper laboratory practice.

One common method of statistical analysis is based on the mean and standard deviation of the data over time. If new data differs from historical data by a pre-determined statistical variation (e.g., three standard deviations from the mean), the analyzer may be malfunctioning.

Various rules have been developed for conducting a statistical analysis of the data. The so-called Westgard rules normally compare new data from an instrument in a particular laboratory against historical data from that same laboratory. However, analyzing only the data from the same instrument within the same laboratory, rather than from a comparable peer group working with different instruments in different laboratories, can cause a test to suggest an instrument is malfunctioning, when in fact it is not.

Under the Clinical Laboratory Improvement Act of 1988, laboratories testing certain analytes on human specimens are required to participate in a testing program in which a designated agency distributes blind samples to a group of participating laboratories. The results are tabulated and analyzed according to rules specified by government regulation. For example, the grading limits for glucose state that a participant laboratory must have a result falling within 6 mg/dL from the mean of the group or +−10% of the mean of the group, whichever is greatest. The grading limits under the federal regulations are generally more liberal than the Westgard rules because they are based to some degree on clinical significance of allowable error. In addition, the historical data used for comparative analysis is collected from a peer group of different analyzers in different laboratories, which is believed to be more reliable information than that selected from a single analyzer.

An inter-laboratory quality assurance program is disclosed in U.S. Pat. No. 4,858,154, which is incorporated herein by reference. Prior art systems for doing comparative analysis on inter-laboratory data have relied upon electronic data input from a number of laboratories to a central computer where the data is analyzed and a report is sent to the participating laboratory in either electronic or hard-copy form. The shortcomings of these prior art systems include the fact that there is normally a delay of anywhere from several days to weeks to obtain a report from the data processing center. By the time the report is received and there is an indication of malfunction of a particular analyzer, hundreds or thousands of specimens may have already been processed. Heretofore, there has been no procedure for a participating laboratory to input data and then synchronize their data with the historical data prior to analysis. It has also heretofore not been possible to obtain real time analysis to permit the laboratory to make an immediate determination of the reliability of a particular instrument.

A further shortcoming of the prior art has been that the participating laboratory which is coupled with a central data repository to select the most appropriate category of data for comparative analysis. For example, in some instances it may be preferable to make a comparative analysis with instruments in a particular geographic region, while in other instances it may be desirable to do the comparative analysis based upon a particular instrument model.

OBJECTS OF THE INVENTION

It is therefore an object of the present invention to allow analysis of an instrument based on the federal regulations or the Westgard Rules for evaluating the data on an on-demand, rather than a periodic, basis.

It is therefore an object of the present invention to provide a method of evaluating the performance of an instrument by comparing operating data with historical data whereby the current data can be input to a global database prior to making the comparative analysis.

Another objective of this invention is to provide a method for evaluating the performance of an instrument by comparing operating data with historical data whereby the historical data may be accessed and retrieved prior to conducting the comparative analysis.

Another very important object of the invention is to provide a procedure for evaluating instrument performance by comparing operating data with historical data whereby the historical data is grouped into categories for comparative analysis and the evaluation procedure may include selecting a particular group of data for comparative analysis purposes.

Another one of the aims of the present invention is to provide a procedure for evaluating the performance of an instrument, particularly a hematology analyzer, wherein all of the procedural features set forth in the foregoing objectives are available instantaneously in real time by any participating laboratory.

Still another one of the objects of the invention is to provide a method of evaluating the performance of an instrument as set forth in the aims and objects preceding wherein each participating laboratory may communicate directly with the repository so that the historical database is continuously updated.

To accomplish these and other objectives, a user preferably begins by conducting an operation on a desired instrument and obtaining individual data from this operation. The user then stores the individual data in a client database on a client computer, such as a PC. The user also preferably stores in the client database rules for analyzing the data and a report capability to display the results of such analysis. The client computer is provided with a capability for transferring data, such as a modem providing access to the Internet, to exchange data with a global database on a server computer. Alternatively, such data transfer between the client database and the global database could occur via a diskette. The global database contains data generated by conducting a substantially identical operation on a group of like instruments.

The user selects desired attributes and the desired group data and then synchronizes to a desired extent the data in the client database with the data obtained from the global database. During synchronization, the data from the operation is transferred to a global database. Similarly, the local database can accept data from the global database corresponding to the user's selected instrument(s).

After synchronization, the local client database contains current statistical data concerning the peer-groups in which the laboratory is participating and other peer-groups of interest to the user. Using the client database, the user can then immediately perform desired statistical analyses, among other reasons, to set the group mean for analysis of the daily that data in accordance with federal regulations.

BRIEF DESCRIPTION OF THE DRAWINGS

In the accompanying drawings, which form a part of the specification and are to be read in conjunction therewith and in which like reference numerals are used to indicate like parts in the various views:

FIG. 8 is a flowchart illustrative of a software program for synchronizing data at a local client database with data at a webhosted database; and FIG. 9 is a flowchart illustrative of a software program for synchronizing data at a webhosted database with data at a local client database.

DETAILED DESCRIPTION OF THE INVENTION

The invention is preferably carried out in a data processing environment comprising a client computer containing a client database, a server computer containing a global database and a capability for data transfer between the client computer and the server computer. The client computer is preferably a personal computer (PC) or similar unit. The client database is preferably programmed using a commercially available database software, such as Microsoft Access, although other software having a data management capability could be used. As will be understood by those skilled in the art, the client database is preferably programmed to allow a user to easily carry out the necessary data management, such as inputting data, and statistical operations. Such programming could be achieved using Borland's Delphi 4 language, the C++ language or the Java language.

The global computer is preferably a Unix web server class computer containing the global database, which is preferably implemented using the Microsoft SQL or the Oracle database program. The global database preferably is stored on an Internet web server having an application server software, such as Oracle Application Server, Windows DNA or Netscape Application Server. An important requirement of the global server is that it have a relational database software and a Web connection software.

The data transfer capability is preferably a communication link implemented using a high-speed Internet connection, although standard analog telephone Internet connections can suffice. Alternatively, the global server and client computer are capable of exchanging data stored by using a standard diskette.

Figure 1:
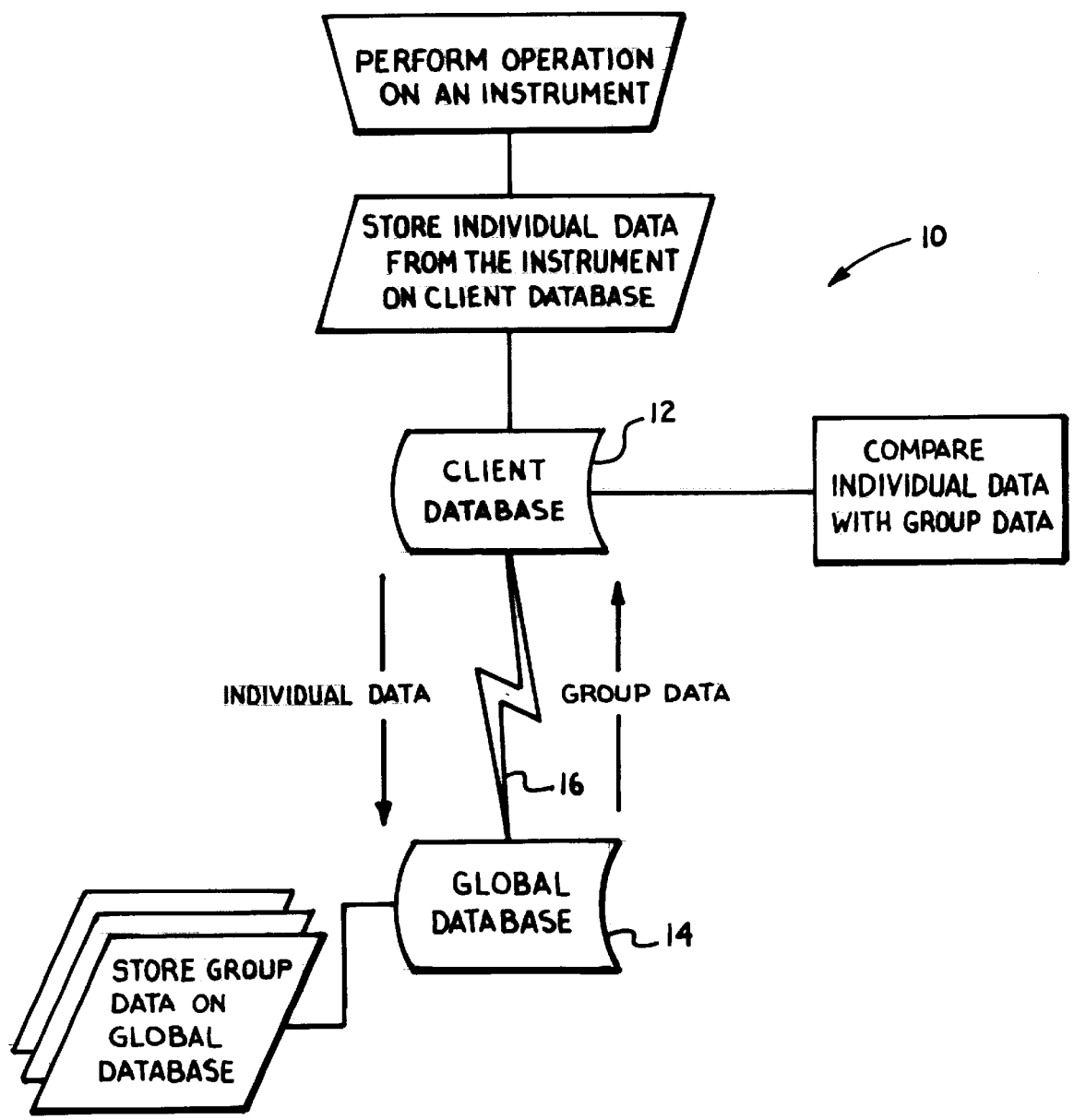
FIG. 1 is a flowchart overview of the invention showing a single client computer and client database.

With reference initially to FIG. 1, a flow diagram illustrative of the present invention is illustrated generally by the reference numeral 10. As illustrated, this embodiment of the present invention necessitates a client data base 12 and a global data base 14 connectable via a communications network, indicated by reference numeral 16. The local client database 12 maintains QC (Quality Control) data that has originated from the lab, peer-group data that has been transmitted from the webhost, rules on how to analyze the QC data, the necessary auxiliary records for maintaining the system (i.e. instrument, test, and unit records, access times, etc.) and has the ability to produce various statistical summaries of groupings of data dynamically; i.e., the QC data mean for a set of analytes for a defined time range.

The global database 14 (or webhost) maintains the QC data from the local clients and has the ability to produce various statistical summaries of groupings of the data dynamically; i.e., the mean of all clients from a definable geographical region for a set of analytes for a defined time range.

The Local QC Network Client has the ability to import local QC data from the LIS and can synchronize with the Global QC Network database on demand. Upon synchronization, the global system receives any new or modified data from the client system since the last synchronization. The global system then updates its group statistical summaries and transmits the summarized group data to the requesting client along with any new or modified auxiliary records for system maintenance information that need to be distributed. This propagates the global QC database to the client each time synchronization occurs.

After synchronization, the local client database contains current statistical summaries of the peer-groups that the laboratory is participating in and other peer-groups that the laboratory has expressed an interested in. These statistical summaries may then be used, among other things, to set the group mean for analysis of the daily QC data with the CLIA '88 rules.

The local client system has extensive data analysis capabilities. It allows the user to define two statistical blocks of data (stat block A and stat block B) to be analyzed where a statistical block has the following selection criterion:

Identity: either an instrument in this laboratory or a group of instruments in this laboratory, the laboratories in a user definable specific peer-group, the laboratories in a country, or all the laboratories in the world.

Time Frame: a specification can be made of the time frame over which to look at the data.

Shift: when the identity is an instrument in the client laboratory or a group of instruments, a specification can be made to select work shift or combine the data derived from all work shifts.

Peer-Group Type: data can be combined with:
 a specific instrument, test, method, and reagent,
 a specific instrument and test without regard to method and reagent, a specific instrument, test and method without regard to reagent, a test and method without regard to instrument or reagent, a test and reagent without regard to instrument or method, a test without regard to instrument, method or reagent.

In each instance of instrument, the user may specify a class of instruments, which behave in a similar fashion.

Once the statistical blocks are defined, the system can produce a statistical analysis of the selected data including: number of points in the data set, mean of the data set, median of the data set, standard deviation of the data set, coefficient of variation of the data set, the standard deviation index of 1 statistical block in reference to the other, the coefficient of variation index of 1 statistical block in reference to the other.

The data can also be plotted using Levey-Jennings plots, Youden Plots, or Yundt Plots, with the frame of reference being able to be changed from stat block A to stat block B.

Accordingly, this approach embodies the following aspects of the invention:

1) The group data is available in a local database for manipulation and analysis
2) The group data is collected electronically from the participant laboratories through the synchronization process
3) The group data can be refreshed upon demand
4) The group data can be used in the analysis of daily QC for bias and relative imprecision
5) The daily QC data can be plotted against the group data dynamically in a variety of ways (against a given time-frame, with different types of plots).
6) The ability to compare to group data in real time gives the laboratorian the only means of knowing he/she is in compliance with the regulatory requirements of CLIA at any time the instrument is operational.
7) The group which is defined by the user can be modified dynamically.

Figure 2:
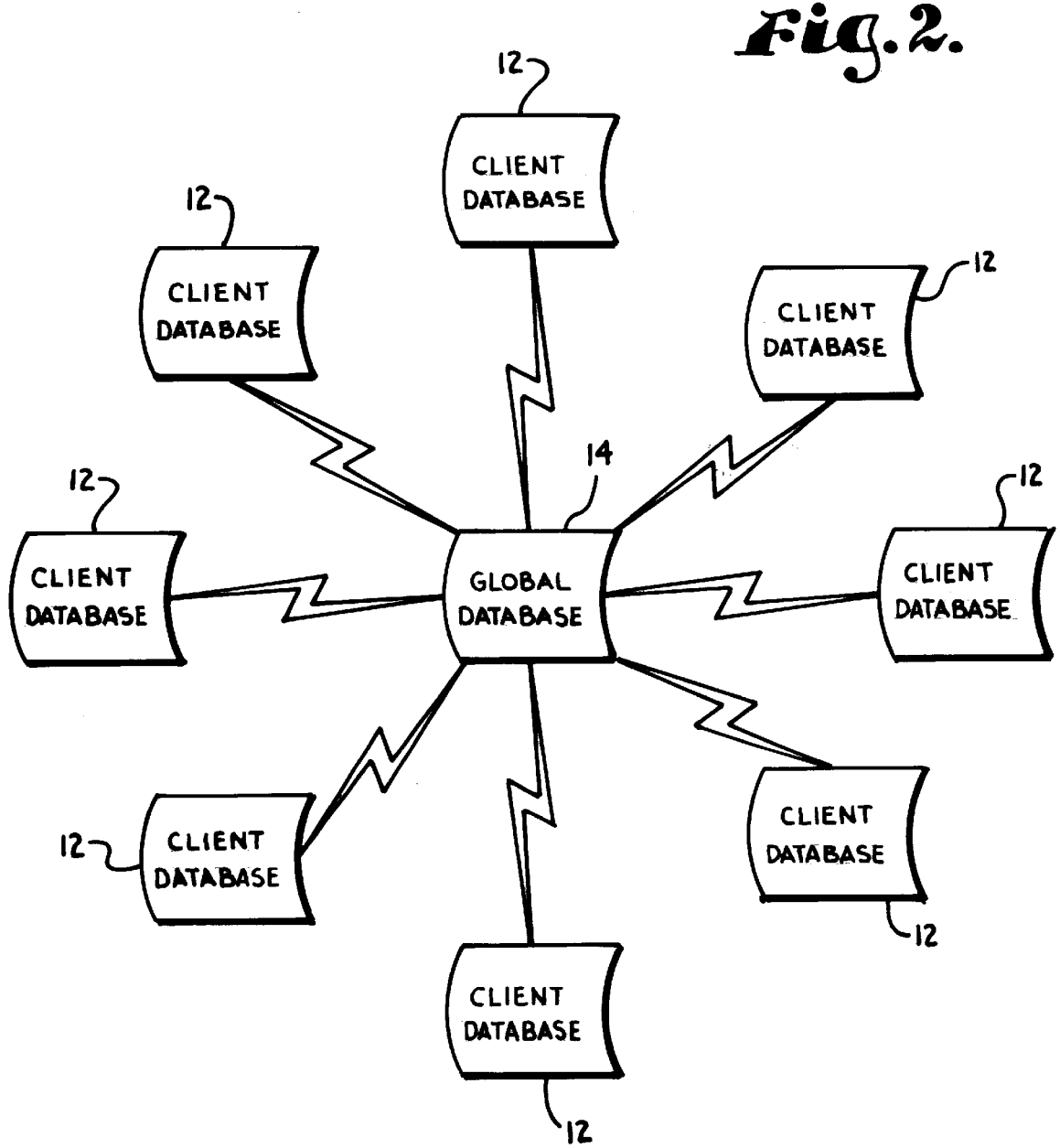
FIG. 2 is a flowchart of the invention illustrating multiple client computers in communication with the global database.

With reference now to FIG. 2, a schematic representation of an overall system according to the present invention is illustrated. In particular, a plurality of client data bases 12 are connected to global data base 14. As will be understood and appreciated, statistical analyses are performed based upon input from each of the plurality of client data bases 12.

Figure 3:
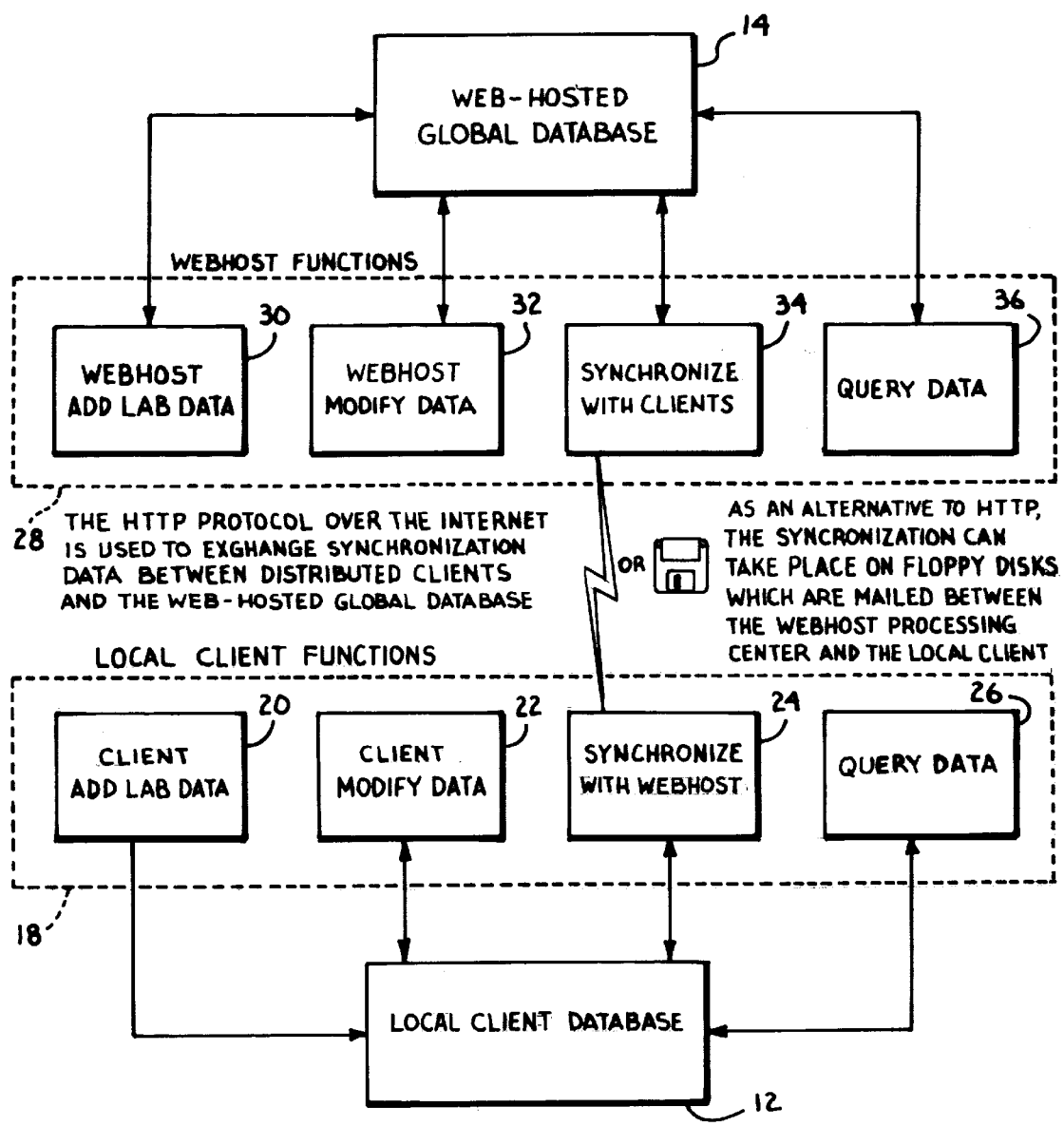
FIG. 3 is a detailed block diagram illustrative of the Quality Control network and system of the present invention.

With reference to FIG. 3, a more detailed block diagram indicative of the present invention and, particularly, indicative of the distributed quality control at work functionality principles of the present invention, local client functions are indicated generally within box 18. As illustrated, these functions include a "Client Add Lab Data" function which permits the client to add data to the local client data base, as indicated at reference numeral 20, a "Client Modified Data" function, indicated by reference numeral 22, which permits the local client to modify data in the local client data base, a synchronize with webhost function, indicated at reference numeral 24, which permits data in the local client data base 12 to be synchronized with data in the webhost global data base 14, and a query data function, indicated at step 26, permitting the local client to query data in the local data base.

As also illustrated, those functions within the box 28 are carried out at the host server for the global data base 14. In particular, web host functions include a "Webhost Add Lab Data" function, indicated by reference numeral 30, a "Webhost Modify Data" function indicated by reference numeral 32, a "Synchronize With Clients" function indicated by reference numeral 34, and a "Query Data" function indicated by reference numeral 36.

With reference now to FIGS. 4–9, each of the functions indicated by reference numerals 20, 22, 24, and 30, 32 and 34 are illustrated and described in detail.

Figure 4:
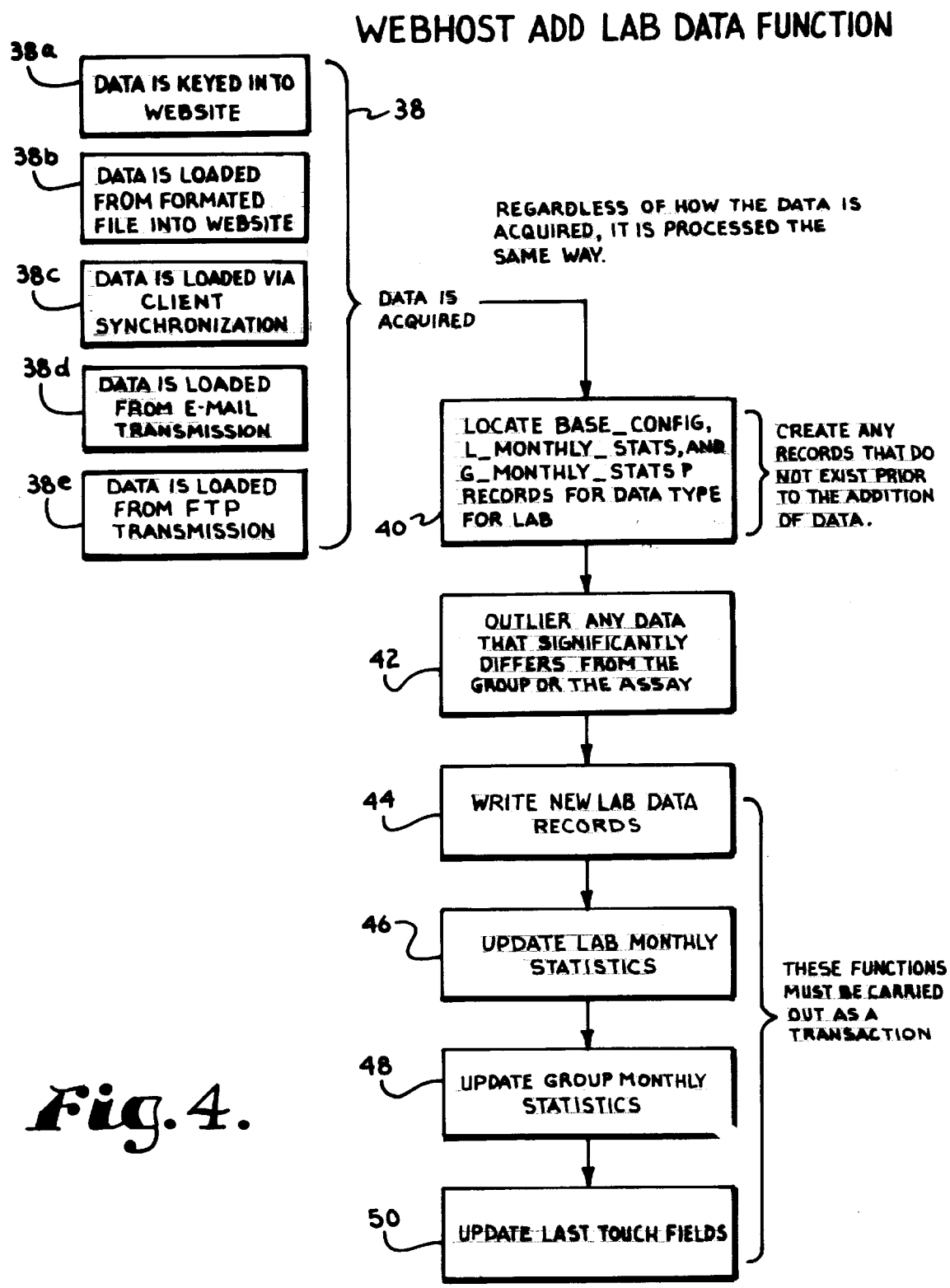
FIG. 4 is a flowchart illustrative of a software program for adding laboratory data to a webhosted database.

In particular, with reference to FIG. 4, the "Webhost Add Lab Data" function 30 is illustrated and described. As indicated generally by reference numeral 38, lab data to be added to the webhosted global data base 14 is acquired. Acquisition of this data may be made in a number of ways, such as entering the data into the website through a keypad, as indicated at reference numeral 38a, loading the data from a formatted file onto the website, as indicated by reference numeral 38b, loading the data directly from the local client database utilizing client synchronization as indicated at reference numeral 38c, loading the data from an e-mail transmission, as indicated at step 38d, or loading the data from an FTP transmission, as indicated at step 38e.

Regardless of how the data is acquired, it is processed in the same way. In particular, as indicated at step 40, records necessary for processing the acquired data are located or, if non-existent, created. As indicated at step 42, any data that significantly differs from the group or the assay, based upon a comparison performed at the web host server, is outliered. Then, as indicated at step 44, new lab data records, based upon the acquired data, are written. Lab monthly statistics are then updated, as indicated at step 46. Group monthly statistics are then updated as indicated at step 48, and last touch fields are updated as indicated at step 50. It will be understood and appreciated that the time period other than monthly may be programmed.

Figure 5:
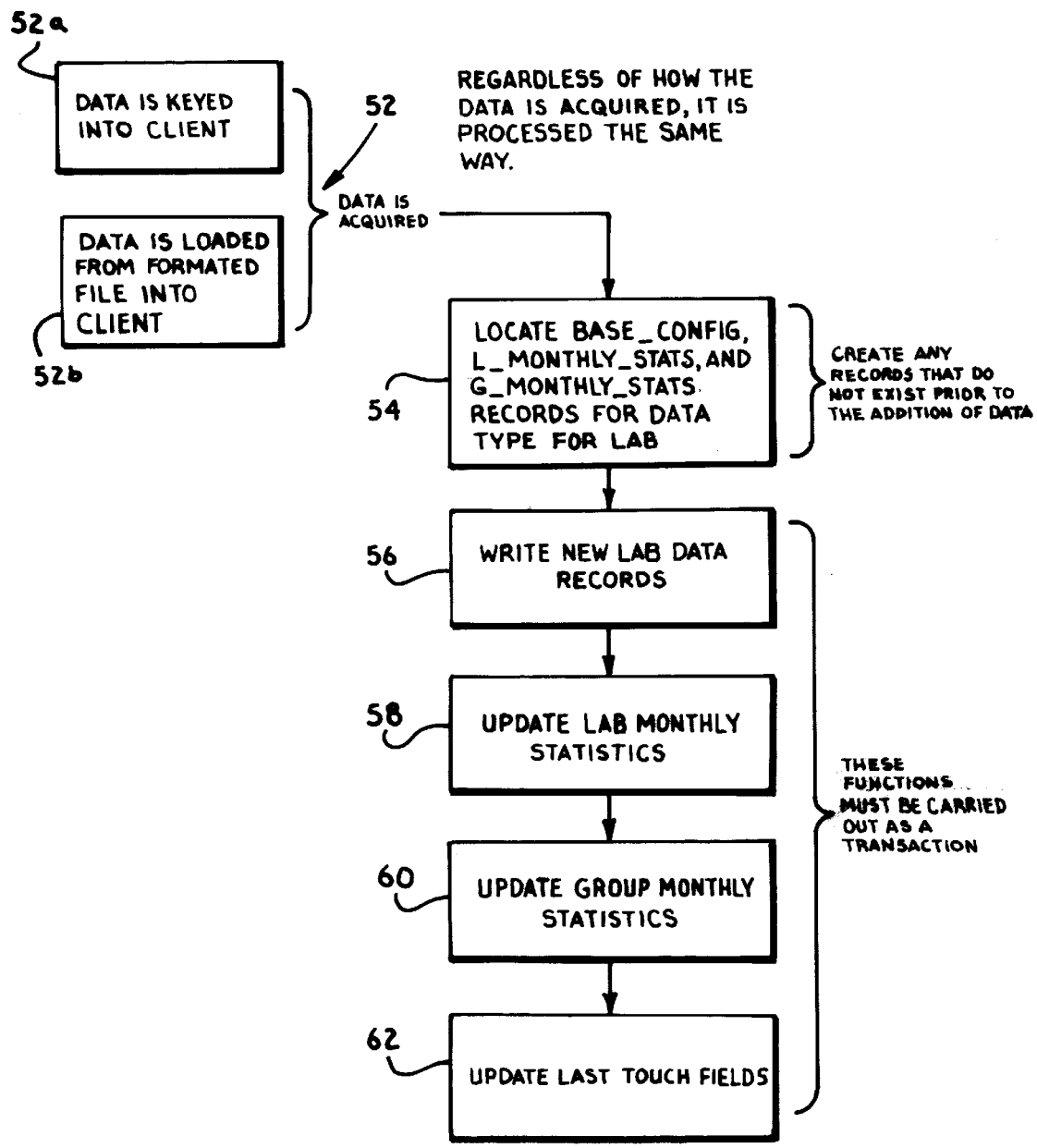
FIG. 5 is a flowchart illustrative of a software program for adding laboratory data to a local client database.

As illustrated in FIG. 5, the "Client Add Lab Data" function 20 is illustrated and described. As illustrated at step 52, data is acquired. Data may be acquired by keying the data into the client data base 12, as indicated at step 52a, or may be loaded from a formatted file into the client, as indicated at step 52b. It will be understood and appreciated that various ways of acquiring data are contemplated and within the scope of the present invention. Regardless of how the data is acquired, it is processed in the same way. In particular, as indicated at step 54, those records necessary for processing the data are located or, if non-existent, created. The new lab data records are then written, as indicated at step 56, the monthly statistics (e.g., lab and group) are updated based upon the added data as indicated at steps 58 and 60, respectively, and the last touch fields are updated as indicated at step 62.

Figure 6:
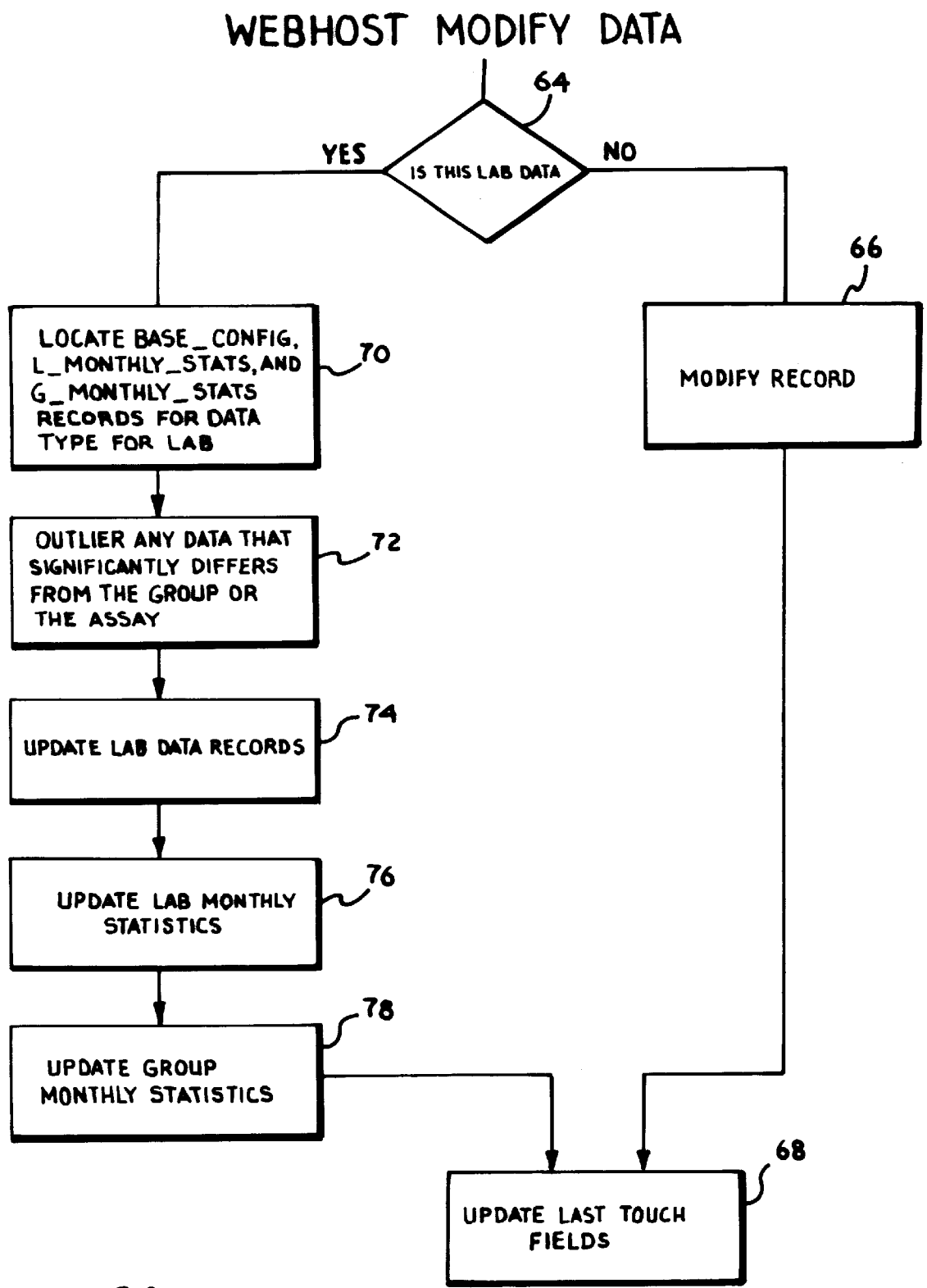
FIG. 6 is a flowchart illustrative of a software program for modifying data acquired at a webhosted database.

With reference now to FIG. 6, the "Webhost Modify Data" 32 is illustrated and described. In particular, the server at the webhost determines whether the data is data from a lab, as indicated at reference numeral 64. In the event the data is not lab data, a corresponding record is modified as indicated at step 66, and the last touch fields are updated as indicated at step 68. However, when the webhost server determines that the lab data is lab data, at step 64, processing advances to step 70, where the necessary records are located or created. Processing then advances through steps 72, 74, 76 and 78 where, correspondingly, any data that significantly differs from the group or the assay is outliered, and the lab data records, lab monthly statistics, and group monthly statistics are updated. Processing then advances to step 68 where the last touch fields are updated.

Figure 7:
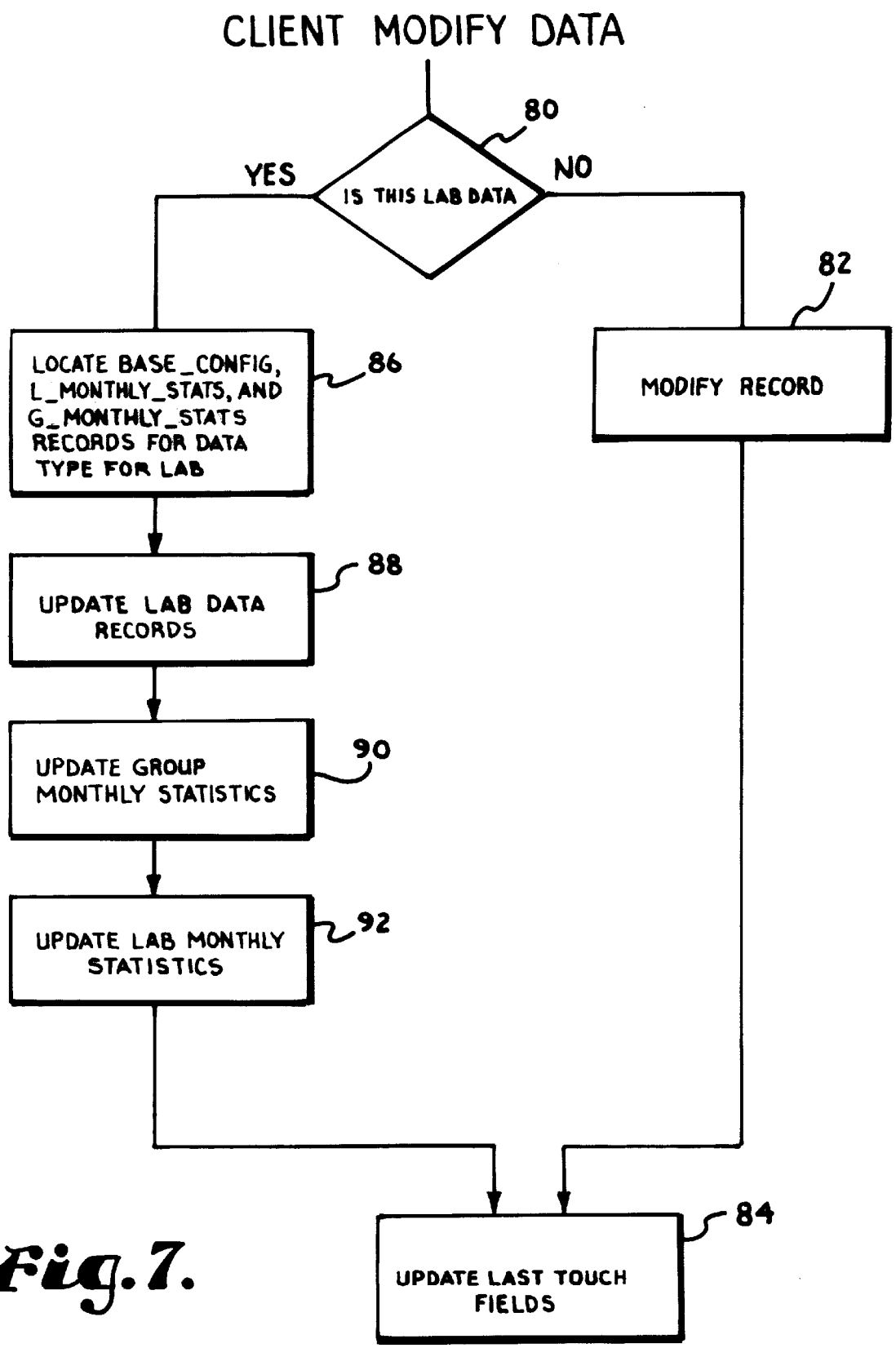
FIG. 7 is a flowchart illustrative of a software program for modifying data at a local client database.

With reference now to FIG. 7, the "Client Modify Data" function 22 is illustrated and described. In particular, the local client server determines at step 80 whether the data is lab data. When it is determined that the data is not lab data, a corresponding record is modified, as indicated at step 82, and the last touch fields are then updated as indicated at step 84. However, when it is determined at step 80 that the data is lab data, processing advances to step 86, at which the necessary records are retrieved or created. Processing then advances to step 88, at which lab data records are updated, to step 90, at which group monthly statistics are updated, and to step 92, at which lab monthly statistics are updated. Processing then advances to step 84 where the last touch fields are updated.

With reference now to FIG. 8, the "Client Synchronize Webhost" function 24 is illustrated and described. In particular, utilizing an input, a user selects data at the local client database 12 to synchronize, as indicated at step 94. At step 96, transaction records are written. At step 98, an RT file is created. At step 100, a determination is made whether local client server is synchronized via an Internet connection with the processor hosting the global database 14. In the event there is no such Internet synchronization, processing advances to step 102, so that the RT file may be sent via a disk through the mail to the processing center. Processing then advances at step 104, at which the processing center returns a group response RT file on the disk (including the processed data updates) to the local client.

When, however, it is determined at step 100 that an Internet synchronization is in place, processing advances to step 106 so that the RT file may be transmitted to the global data base 14 via an Internet protocol. Processing then advances to step 108 at which the web host processing center returns a transaction key to the local client. At step 110, the client sends a post transaction key back to the website to check for a group response RT file. This check is continued periodically until the group response RT file is located, or until the user aborts the process. Assuming the process is not aborted by the user, once the group response RT file is located, the webhost processing center returns the group RT file to the local client, as indicated at step 112. Following step 104 or step 112, as the case may be, processing advances to step 114, at which any lab statistics recorded in the transaction records are factored out of the group statistics. Processing then advances to step 116, at which group statistics are updated with current laboratory statistics.

With reference now to FIG. 9, the "Webhost Synchronize With Client" function 34 is illustrated and described. In particular, at step 118, the webhost processing center receives the client RT file. The webhost server then validates the client RT file as indicated at step 120. The transaction key, described in FIG. 8, is generated as indicated at step 122. At step 124, a determination is made whether there is an Internet synchronization between the webhost processor and the processor at the local client. In the event there is such an Internet synchronization, the transaction key is returned to a client via an Internet protocol, as indicated at step 126. If not, the transaction key must be turned in a more traditional manner. As indicated at step 128, the webhost server processes the client RT file. At step 130, the webhost server generates a response RT file. As indicated at steps 132,134, and 136, in the event there is an Internet synchronization between the webhost server and the local client processor, the response file is returned to the client when the client presents the transaction key via an Internet communication. When, however, there is no such Internet synchronization, the response file is to the client via mail on a diskette.

The following software code corresponds to the previously described function blocks 20, 22, and 24, and 30, 32, and 34, as indicated by the various headings throughout the code.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

I claim:

1. A method for evaluating an instrument by comparing data generated by an operation on the instrument with data generated by a group of like instruments, comprising the steps of:

collecting group data generated by performing substantially the same operation on said group of instruments;

storing said group data;

conducting said operation on an individual instrument and generating individual data from said operation;

identifying a group of like instruments as determined by a user definable non-static criteria; and comparing said individual data with said group data.

2. A method as set forth in claim 1, wherein said collecting step comprises grouping said data into categories for comparative analysis.

3. A method as set forth in claim 2, wherein said identifying step includes selecting a subset of said group data according to a parameter.

4. A method as set forth in claim 3, wherein said individual instrument comprises a hematology analyzer and said parameter is a specified group of instruments.

5. A method as set forth in claim 3, wherein said individual instrument comprises a hematology analyzer and said parameter is a specified geographic area.

6. A method as set forth in claim 3, wherein said individual instrument comprises a hematology analyzer and said parameter is a specified test procedure.

7. A method as set forth in claim 3, wherein said individual instrument comprises a hematology analyzer and said parameter is a specified time period.

8. A method as set forth in claim 1, wherein said storing of individual data comprises storing said individual data with group data before retrieving said group data so that said group data in said comparing step includes said individual data.

9. A computer-readable medium having computer-executable instructions for performing the method recited in claim 1.

10. A computing system having a memory and a processor, said processor being operable to execute the instructions for the method recited in claim 1.

11. A method in a computing environment for evaluating a hematology analyzer instrument by comparing data generated by an operation on the instrument with data generated by the operation on like instruments, comprising the steps of:

identifying a group of like instruments as determined by a non-static criteria;

collecting group data generated by performing substantially the same operation on said group of like instruments;

storing said group data on a first computing system;

conducting said operation on an individual instrument and generating individual data;

storing said individual data on a second computing system;

exchanging said group data and said individual data between said first computing system and said second computing system by a synchronization process, said synchronization being initiated at will at said second computing system; and analyzing said individual data and said group data on said second computer system, said analyzing including manipulating said group data and generating multiple plots of individual data versus group data including a time-frame plot, a geographic region plot, an instrument type plot and a composition utilized plot.

12. A method as recited in claim 11 wherein said computing system includes a hematology analyzer.

13. A computer-readable medium having computer-executable instructions for performing the method recited in claim 11.

14. A computing system having a memory and a processor, said processor being operable to execute the instructions for the method recited in claim 11.

* * * * *

UNITED STATES PATENT AND TRADEMARK OFFICE
CERTIFICATE OF CORRECTION

PATENT NO.    : 6,549,876 B1
DATED         : April 15, 2003
INVENTOR(S)   : John C. Yundt-Pacheco It is certified that error appears in the above-identified patent and that said Letters Patent is hereby corrected as shown below:

<u>Column 4,</u>
Line 62, insert -- a single -- between "made to select" and "work shift".

<u>Column 7,</u>
Line 59, insert -- sent -- between "file is" and "to the".

Signed and Sealed this

Seventh Day of October, 2003

JAMES E. ROGAN
*Director of the United States Patent and Trademark Office*